United States Patent [19]

Bierlein et al.

[11] 4,233,071
[45] Nov. 11, 1980

[54] BEARING HAVING IRON SULFUR MATRIX

[75] Inventors: John C. Bierlein, Washington; Edward J. Shipek, Sterling Heights, both of Mich.

[73] Assignee: General Motors Corporation, Detroit, Mich.

[21] Appl. No.: 970

[22] Filed: Jan. 4, 1979

Related U.S. Application Data

[63] Continuation of Ser. No. 719,857, Sep. 9, 1976, which is a continuation-in-part of Ser. No. 621,495, Oct. 10, 1975, Pat. No. 3,985,408.

[51] Int. Cl.³ .............................. B22F 5/00; B22F 3/26
[52] U.S. Cl. ..................................... 75/231; 75/201; 428/566

[58] Field of Search ................... 75/201, 231; 428/566

[56] References Cited

U.S. PATENT DOCUMENTS

| 2,799,080 | 7/1957 | Duckworth | 75/201 |
| 3,120,699 | 2/1964 | Russo | 75/201 |

Primary Examiner—Brooks H. Hunt
Attorney, Agent, or Firm—Elizabeth F. Harasek

[57] ABSTRACT

A bearing with or without a backing comprising a sintered porous body formed of a composition containing ½ to 6% by weight sulfur, 0 to 60% copper, and the balance iron. The body may be impregnated with a lubricant.

3 Claims, 4 Drawing Figures

BEARING HAVING IRON SULFUR MATRIX

This application is a continuation of our copending application Ser. No. 719,857, filed Sept. 9, 1976 which is a Continuation-in-Part of Ser. No. 621,495, filed Oct. 10, 1975, now U.S. Pat. No. 3,985,408, issued Oct. 12, 1976.

FIELD OF THE INVENTION

This invention relates to bearings of the type which have a relatively hard, porous, sintered metal or alloy body in which may be dispersed a lead or lead alloy, or a solid lubricant such as graphite, or a fluid lubricant such as a mineral oil.

DESCRIPTION OF THE PRIOR ART

A bearing structure in present day wide-spread use is manufactured by sintering a powder consisting of by weight, 85% copper and 15% nickel onto an SAE 1008 steel backing plate to form a porous matrix and casting a high lead base babbitt consisting of by weight, 4% tin, 3.5% antimony, and the balance lead onto the copper-nickel matrix and held to a thickness of 0.005 inch or less. The disadvantage of this bearing resides in the high cost of nickel and copper as well as only fair score resistance when the babbitt overlay has worn away and the journal is exposed to the matrix.

Another prior art bearing material is disclosed in the U.S. Pat. No. 2,799,080 which consists of an iron matrix in which is dispersed lead in a proportion of 10 to 50% by weight and a sulfide of a metal selected from the group consisting of iron, lead, copper and tin in the proportion of 0.5% to 10% by weight.

SUMMARY OF THE INVENTION

In accordance with this invention, a bearing material is formed by sintering a powdered mixture containing iron and sulfur. Optionally up to 60% of the iron may be replaced by copper to permit a reduction of the sintering temperature of the mixture. Compaction of the mixture also reduces the sintering temperature. Elemental sulfur, metal sulfides or a combination of these is added directly to the iron powder so that after sintering the sulfur content of the pororus body is ½ to 6% by weight. Sintering causes the powder particles to fuse and alloy into a coherent iron, sulfur; and optionally copper, bearing body characterized by high score resistance and sufficient porosity for impregnation with a desired lubricant. Adjacent particles are fused directly to each other in a continuous (though porous) matrix. Once the matrix is formed, impregnation with a solid lubricant, such as babbitt, or a liquid lubricant, such as oil, does not disrupt the bonds between adjacent particles, or adversely effect the excellent score resistance provided by directly sintering iron and sulfur together.

In a preferred form, the invention comprises a steel backing to which is bonded the relatively hard porous matrix with a lead or lead alloy or a solid lubricant being impregnated in the matrix. The lead or lead alloy may also be present as an overlay over the matrix. A good application for this bearing is an automotive engine journal bearing.

In another preferred form of our invention, the hard porous matrix may be employed without a steel backing. It may be impregnated with babbitt or a solid lubricant or with a lubricating fluid. Simple bushings or bearings can be made from such hard porous bodies.

BRIEF DESCRIPTION OF THE DRAWINGS

The details of the invention are disclosed in the following description made in connection with the accompanying drawings in which.

DESCRIPTION OF THE PREFERRED EMBODIMENT

Figure 1:
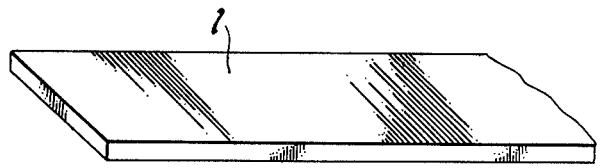
FIG. 1 is a steel backing strip.

The present invention consists basically in using a matrix which consists essentially of iron alloyed with sulfur made by sintering a powdered mixture of iron and iron sulfide or other suitable sulfide such as tin sulfide or copper sulfide or elemental sulfur. Good score resistance is obtained with the sulfur content of the iron matrix being in the range of about ½ to 6% by weight.

EXAMPLE 1

A bearing structure in accordance with the preferred embodiment of this invention was made by first providing a steel plate as for example of SAE 1008 steel, 0.051 inch thick. The steel sheet was cleaned in acetone and rubbed with emery cloth. A powdered mixture was prepared consisting of iron and iron sulfide having a mesh size of minus 120, plus 140 in proportion such as to contain a calculated 1% by weight sulfur and the balance iron. A layer of the mixture about 0.022 inch thick was applied over the steel plate by means of a trowel. The composite was then inserted into an induction furnace. The furnace was vacuum purged to 12 microns two times and filled with argon. The furnace was then heated at 2300° F. for four minutes to sinter the powdered layer and bond the resulting porous matrix to the backing plate and permitted to cool. The final matrix composition was analyzed at 0.8 percent sulfur and the balance iron.

Next, a particulate babbitt consisting of 3.5% by weight antimony, 4% tin and the balance lead was sprinkled over the matrix, together with an additional 4% tin (4% of the babbitt weight) and with a zinc chloride flux. This assembly was placed in the induction furnace and heated to 680° F. for a time sufficient to melt and flow the babbitt over the matrix and to impregnate the pores of the matrix and to provide an overlay of babbitt up to about 0.005".

The bearing structure was tested by means of the score test machine described in the paper "Scoring Characteristics of Thirty-Eight Elemental Metals in High Speed Sliding Contact with Steel", by A. E. Roach, C. L. Goodzeit, and R. P. Hunnicutt, American Society of Mechanical Engineers, Paper No. 54-A-61, November, 1954.

Briefly, the test uses a small flat slider as a test sample of the material to be tested which is loaded against a rotating steel disc with an entrant angle of one-half degree and with a kerosene lubricant therebetween. When running the test, the load is gradually increased in accordance with a straight light relationship from zero to 1500 pounds over a period of 6 minutes with a sliding velocity of about 725 inches per second. The disc surface roughness is carefully established to determine the effective score resistance of the material to be tested. It is important that the disc be neither too rough nor too smooth so that the score resistance properties of different materials may be readily distinguished or separated from one another. A roughness of about six microinches has been found effective for this embodiment. A bearing material which can satisfactorily carry a full load in this roughness area is considered a successful material for resistance to scoring.

A test material is considered to satisfactorily carry the load during the test if (1) no welding or seizure occurs; (2) if the friction torque between the disc and the sample does not exceed a predetermined value (about 30 pound-inches); and (3) if the temperature of the back side of the test samples does not rise above a predetermined value (about 250° F.).

The sample described above was then machined to remove the babbitt overlay. It was subjected to the above described test using a disc roughness of 5.8 microinches and found to have satisfactory score resistance. The overlay was removed so that the score resistance test was performed on the impregnated matrix and not on the overlay.

EXAMPLE 2

A matrix was formed on a steel plate by a procedure similar to that described in Example 1 wherein the matrix composition was varied by adding copper powder to the initial mixture to produce a calculated composition of 30% by weight copper, 3% sulfur, and the balance iron. The composition was sintered in an argon atmosphere for 7 minutes at 2050° F. and sulfur content was about 2.6%. The same babbitt as in Example 1 +4% tin was applied to the matrix and machined for testing as in Example 1 and the bearing structure was tested for score resistance and gave satisfactory results using a disc roughness of 6.5 microinches.

EXAMPLE 3

A matrix was formed on a steel plate by a procedure similar to that described in Example 1 wherein the matrix composition was varied by adding copper powder to the initial mixture to produce a calculated initial composition of 50% copper, 3% sulfur, and the balance iron and wherein the preoxidation sintering technique was used. The mixture was heated initially in an atmosphere consisting of 25% air and the balance argon to partially oxidize the iron. When a temperature of 2050° F. was reached the oxygen was purged with argon and the mixture was heated for seven minutes in an argon atmosphere to provide a sintered matrix about 0.013 inch thick having a sulfur content of about 2.6%. The oxidation step enhanced the sintering. The matrix was impregnated as in Example 1 with a babbitt consisting of 4% by weight tin, 3.5% antimony and the balance lead with an additional 4% tin, 4% of the weight of the babbitt. The bearing structure was machined for testing as in Example 1 and tested for score resistance and gave satisfactory results using a disc roughness of 5.7 microinches.

EXAMPLE 4

A matrix was formed by a procedure similar to that described in Example 1 wherein the initial calculated composition was 4% sulfur and the balance iron. The powdered layer was sintered in an argon atmosphere at about 2300° F. for four minutes to form a matrix layer about 0.032" thick with a final sulfur content analyzed to be 2.9%. The porous matrix was impregnated with a babbitt consisting of 4% tin, 3.5% antimony and the balance lead plus an additional 4% tin, 4% of the weight of the babbitt and machined for testing in the manner described in Example 1. The bearing structure was tested for score resistance and gave satisfactory results using a disc roughness of 6.5 microinches.

EXAMPLE 5

A matrix was formed by a procedure similar to that described in Example 3 wherein an initial calculated powdered matrix composition of 30% copper, 4% sulfur and the balance iron was heated in a controlled oxidizing atmosphere to 2050° F. and then sintered at this temperature in an argon atmosphere for 7 minutes to form a matrix layer about 0.016 inch thick having a sulfur content estimated at 3.0%. The sintered matrix was impregnated with a babbitt consisting of 4% tin, 3.5% antimony and the balance lead +4% tin, 4% of the weight of the babbitt and machined for testing as described in Example 1. The matrix was tested for score resistance and gave satisfactory results using a disc roughness of 6.1 microinches.

EXAMPLE 6

A matrix was formed by a procedure similar to that described in Example 3 wherein an initial calculated powdered composition of 4% sulfur, 50% copper and the balance iron was heated in a controlled oxidizing atmosphere to about 2050° F. and then sintered at this temperature in an argon atmosphere for seven minutes to form a matrix layer about 0.012 inch thick having a sulfur content of 3.0%. The sintered matrix was impregnated with babbitt consisting of 4% tin+3.5% antimony and the balance lead+an additional 4% tin, 4% of the weight of the babbitt and machined for testing as described in Example 1. The matrix was tested for score resistance and gave satisfactory results using a disc roughness of 6.0 microinches.

EXAMPLE 7

A matrix was formed by a procedure similar to that described in Example 3 wherein an initial calculated powdered composition 60% copper and 4% sulfur was initially heated to 1935° F. in a controlled oxidizing atmosphere and then sintered in argon for 7 minutes to produce a matrix about 0.014 inch thick having a sulfur content estimated at 3.0%. The sintered matrix was impregnated with a babbitt+tin as in Example 6 and machined for testing. The matrix tested satisfactorily for score resistance with a disc roughness of 5.7 microinches.

EXAMPLE 8

A matrix was formed by a procedure silimar to that described in Example 3 wherein an initial calculated powdered composition 60% copper and 5% sulfur was initially heated to 1935° F. in a controlled oxidizing atmosphere and then sintered in argon for seven minutes to produce a matrix about 0.016 inch thick. The matrix was impregnated with a babbitt consisting of 4% tin, 3.5% antimony and the balance lead+an additional 4% tin, 4% of the weight of the babbitt as in Example 6 and machined for testing. The matrix tested satisfactorily for score resistance with a disc roughness of 6.1 microinches.

EXAMPLE 9

A bearing structure was made by first preparing a 120 mesh powder mixture consisting essentially of 3.2 grams copper, 0.88 gram iron sulfide and 11.92 grams iron. This combination of starting materials produces a bearing with an overall composition by weight of about 20% copper and 2% sulfur with the balance iron. One percent by weight zinc stearate, which is expelled during sintering, was mixed with the powder to increase flow and compaction of the powder and thus the green strength of the compact. A sufficient amount of the powder was placed in a one inch diameter cylindrical mold so that after compaction the green compact was about ⅛ inch thick with a porosity of about 29%. The powder was compressed in the mold with a compaction force of 18,000 pounds. The green compact was removed from the mold and sintered on a nonadherent base in a helium-5% hydrogen atmosphere at 2050° F. for 7 minutes.

The porous sintered disc was subjected to the score test described in Example 1. A disc roughness of about 4.5 to 5 microinches was found to be effective for testing the score resistance of embodiments without backing or babbitt impregnation. Kerosene was allowed to flow into the pores of the bearing structure, and between the structure and the disc, throughout the test.

The sample exhibited satisfactory score resistance when tested at a disc roughness of 4.7 microinches.

The success of the composition of this invention is in the addition of sulfur to the iron. The sulfur is preferably added as iron sulfide as in the above examples but may also be added in the form of other metal sulfides such as tin or copper sulfide, or elemental sulfur. If such metal sulfides are added, the same matrix performance is obtained.

Satisfactory bearings are obtained with a sulfur content in the composition prior to sintering ranging from about ½ to 6% by weight. A sulfur content below ½% produces a matrix with inadequate score resistance. A sulfur content above 6% by weight produces severe processing problems. It is generally preferred to maintain the final sulfur content between 1% and 3% as shown in the examples. Copper may be included in the composition up to 60% by weight with satisfactory score resistance as shown in the examples.

A copperless matrix is equally satisfactory but requires a sintering temperature in the range of 2300° to 2350° F. The substitution of copper for the iron in the matrix reduces the sintering temperature more or less in proportion to the copper content. For example, in Example 5 a 30% copper content includes a sintering temperature of 2050° F. and a 60% copper content in Examples 7 and 8 involve a sintering temperature of 1935° F. Accordingly, the amount of copper to be used to a significant extent may be determined by the relative cost of energy in comparison with the cost advantage of iron over copper. In general, temperatures below 2300° F. cannot be used to sinter noncompacted iron-sulfur matrix mixtures because of inadequate diffusion. However, sintering temperatures down to 2050° F. may be used for compositions containing about 30% copper. At the 50% copper level sintering temperatures in the range of 1935° to 1985° F. may be used and at the 60% copper level temperatures down to 1900° F. may successfully be used. Compaction of the composition also reduces sintering temperatures.

Figure 2:
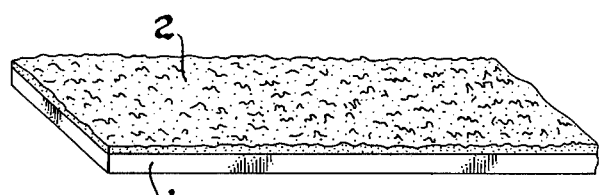
FIG. 2 is the strip of FIG. 1 with sintered powdered mixture of iron and sulfur bonded to the steel to form a porous matrix.

A free standing sintered porous member, illustrated by 2 at FIG. 2, formed without backing 1, is of considerable utility by itself. However, it will be appreciated that babbitt and/or lubricating substances may be introduced into the pores of the member. Nonfugitive lubricants may be added to the powder in any suitable amount. Appropriate amounts of binders or powdered lubricants may also be added to aid compaction molding of the powder which is compressed with sufficient force to achieve a bearing of the desired porosity after sintering. In order to increase the score resistance of a sintered bearing, fluid or solid lubricants can be forced into its pores. Alternatively, a bearing can be impregnated and overlayed with melted lead or babbitt.

As above indicated and known to those skilled in the art, the porosity of a composition is a function of particle size, compaction force, sintering time and sintering temperature.

Figure 4:
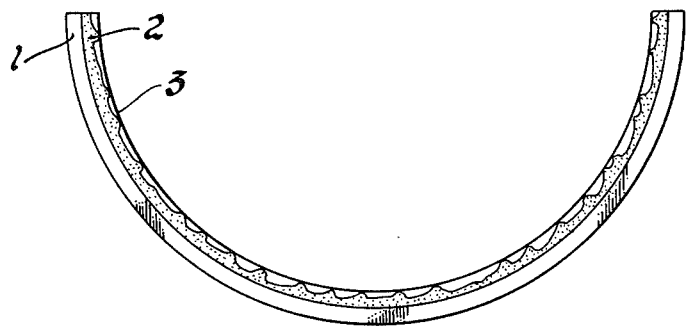
FIG. 4 is an end elevation of a bearing formed from the strip of FIG. 3.

A complex journal bearing as shown in FIG. 4, or a plain porous bearing made of a sintered porous member as illustrated by 2 in FIG. 2 can readily be made in accordance with our invention.

Typtically in a journal bearing, the bearing is initially provided with a babbitt overlay up to 0.005 inch, the overlay could quickly wear away in service so that the journal would then run against the relatively hard, babbitt impregnated, matrix material. The plain porous bearing contemplated by Example 9 could be lubricated with a dry or fluid lubricant for use in light duty applications.

Figure 3:
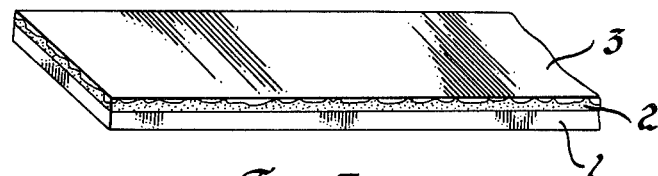
FIG. 3 is a view of the strip after the application of a babbitt to the matrix.

A journal bearing for heavy duty use can be made by first cleaning a steel backing sheet 1 as shown in FIG. 1. The backing may be made of SAE 1008 steel sheet, for example. A powdered mixture of suitable mesh made up of ½ to 6% sulfur, 0 to 60% copper and the balance iron is spread uniformly over the backing. The powder is sintered to the steel backing in an induction furnace at about 2300° for about 6 minutes forming a hard porous bearing layer 2 (FIG. 2). Babbitt 3 (FIG. 3) is cast over the matrix and the composite sheet is stamped or otherwise formed to the semicircular shape of FIG. 4.

As described in the Examples 3 and 8, preoxidation in the sintering step may be employed to enhance the sintering process. The sintering step per se may be performed under a reducing atmosphere to further enhance the sintering.

A bearing for light duty applications such as in a fractional horsepower motor can be made by the method described in Example 9. A powdered mixture of iron, copper, and a metal sulfide is placed in a mold of the appropriate size and compacted at a sufficient force to achieve a bearing with 18% to 30% porosity. The green compact is removed from the mold and sintered in an induction furnace in an inert or slightly reducing gas atmosphere at a suitable temperature of, for example, about 2050° F. for about 7 minutes. The sintered bearing matrix, 2 of FIG. 2, is then impregnated with oil.

By the term babbitt as used herein is meant a lead or tin base bearing alloy. A tin base alloy may include tin as the principle constituent and lead, antimony, copper and arsenic. A lead base alloy may include lead as the principle constituent and tin, antimony, copper and arsenic.

By the term fluid lubricant as used herein is meant any fluid boundary lubricant or lubricating system which may include petroleum oils, synthetic oils, polyglycols, water or fatty oils.

By the term solid lubricant we mean any solid lubricant which may include zinc stearate, graphite, lithium stearate, paraffin or molybdenum disulfide.

While the invention has been described in terms of specific embodiments, other forms may be adopted within the scope of the invention.

The embodiments of the invention in which an exclusive property or priviledge is claimed are defined as follows:

1. A bearing matrix which is a porous coherent body of sintered particles providing score resistance and adapted for lubricant impregnation, said matrix consisting by weight of ½ to 6 percent sulfur; 0 to 60 percent copper; and iron; the copper being present as desired to proportionally reduce the sintering temperature.

2. A bearing body which is a matrix of sintered particles having score resistance and a porosity of about 18 to 30 percent by volume, said matrix being adapted to impregnation with a lubricant and consisting of about ½ to 6 weight percent sulfur, 0 to 60 weight percent copper and the balance iron, the copper being present as desired to proportionally reduce the sintering temperature.

3. A score resistant bearing body formed of a coherent matrix of particles bonded together and alloyed by sintering, the matrix consisting of ½ to 6 weight percent sulfur, 0 to 60 weight percent copper; and iron; the matrix having a porosity of 18 to 30 percent and being adapted for lubricant impregnation.

* * * * *